(12) United States Patent
Cedergaard et al.

(10) Patent No.: US 8,894,410 B2
(45) Date of Patent: Nov. 25, 2014

(54) METHOD AND COOLER FOR COOLING HOT PARTICULATE MATERIAL

(75) Inventors: Niels Ole Cedergaard, Randers (DK); Agust Orn Einarsson, Alborg (DE); Morten Drivsholm, Blokhus (DK); Ejnar Jessen, Mariager (DK)

(73) Assignee: FLSmidth A/S, Valby (DK)

( * ) Notice: Subject to any disclaimer, the term of this patent is extended or adjusted under 35 U.S.C. 154(b) by 839 days.

(21) Appl. No.: 13/000,651

(22) PCT Filed: May 15, 2009

(86) PCT No.: PCT/EP2009/055888
§ 371 (c)(1),
(2), (4) Date: Mar. 2, 2011

(87) PCT Pub. No.: WO2009/156228
PCT Pub. Date: Dec. 30, 2009

(65) Prior Publication Data
US 2011/0159450 A1    Jun. 30, 2011

(30) Foreign Application Priority Data

Jun. 26, 2008 (DK) ................................ 2008 00878

(51) Int. Cl.
*F27D 15/02* (2006.01)
*F26B 25/10* (2006.01)
*C04B 7/47* (2006.01)
*F28F 21/08* (2006.01)
*F28C 3/16* (2006.01)
*F27B 7/38* (2006.01)

(52) U.S. Cl.
CPC ............ *F27D 15/0213* (2013.01); *F26B 25/10* (2013.01); *C04B 7/47* (2013.01); *F28F 21/089* (2013.01); *F28C 3/16* (2013.01); *F27B 7/383* (2013.01)
USPC .............................. 432/77; 110/270; 110/288

(58) Field of Classification Search
CPC ...... C10J 3/34; C01J 3/723; F27D 2019/0056
USPC .................. 432/77, 78; 110/270, 288, 283
See application file for complete search history.

(56) References Cited

U.S. PATENT DOCUMENTS 4,268,274 A * 5/1981 Caughey .......................... 48/111
4,762,489 A * 8/1988 Schmits et al. ................. 432/77

(Continued)

FOREIGN PATENT DOCUMENTS

WO    2006-005997 A1    1/2006

OTHER PUBLICATIONS

Written Opinion of the International Searching Authority of Application PCT/EP2009/055888.

(Continued)

*Primary Examiner* — Gregory A Wilson
(74) *Attorney, Agent, or Firm* — Buchanan Ingersoll & Rooney PC

(57) ABSTRACT

A cooler for cooling hot particulate material which has been subjected to heat treatment in an industrial kiln such as a rotary kiln for manufacturing cement clinker, includes a grate for receiving and supporting hot material from the kiln, at least one cooling gas duct which is connected to slots in the grate for introducing cooling gases into the hot material and a compressed air system for injecting compressed air into the material on the grate. The cooler also comprises at least one flow restricting device provided in the cooling gas duct. Use of the one or more flow restricting devices may permit only a very limited amount of the compressed air that is injected into the material on the grate to pass through the cooling gas duct.

15 Claims, 1 Drawing Sheet

(56) References Cited

U.S. PATENT DOCUMENTS

| | | | |
|---|---|---|---|
| 5,149,266 A * | 9/1992 | Heinemann et al. | 432/77 |
| 5,201,652 A * | 4/1993 | Kawamura et al. | 432/78 |
| 5,584,686 A * | 12/1996 | Nielsen | 432/77 |
| 5,895,213 A * | 4/1999 | Sutoh et al. | 432/77 |
| 6,082,021 A * | 7/2000 | Fons et al. | 34/364 |
| 6,309,210 B1 * | 10/2001 | Marin et al. | 432/14 |
| 8,100,690 B2 * | 1/2012 | Mortensen et al. | 432/77 |
| 2008/0283226 A1 | 11/2008 | Mortensen et al. | |

OTHER PUBLICATIONS

International Search Report for PCT/EP2009/055888 dated Aug. 18, 2009.

* cited by examiner

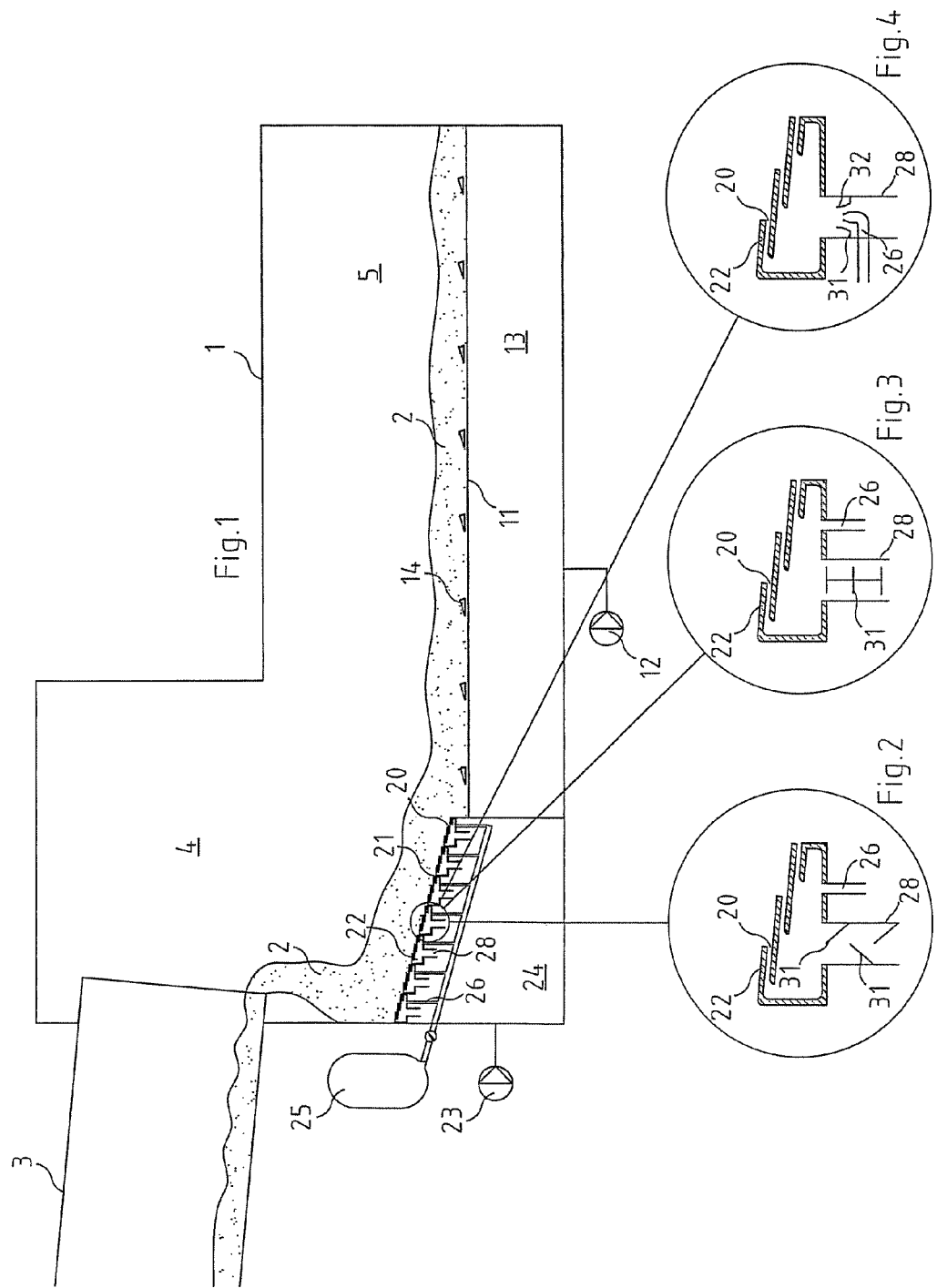

METHOD AND COOLER FOR COOLING HOT PARTICULATE MATERIAL

CROSS-REFERENCE TO RELATED APPLICATIONS

This application is the United States national stage under 35 U.S.C. §371 of International Application No. PCT/EP2009/055888, filed on May 15, 2009, claiming priority to Danish Application No. PA 2008 00878, filed on Jun. 26, 2008. Both of those applications are incorporated by reference herein.

FIELD OF INVENTION

The present invention relates to a cooler for cooling hot particulate material which has been subjected to heat treatment in an industrial kiln, such as a rotary kiln for manufacturing cement clinker, said cooler comprising a grate for receiving and supporting hot material from the kiln, at least one cooling gas duct which is connected to slots in the grate for introducing cooling gases into the hot material and a compressed air system for injecting compressed air into the material on the grate.

BACKGROUND OF THE INVENTION

A cooler of the aforementioned kind is known from EP 1 774 236 where compressed air from a separate system can be intermittently injected into the material on the grate with a view to removing any agglomerates and so-called snowmen formations which have been formed by clogging of clinker material, and causing decreased efficiency of the cooler and where the duct for cooling gases through the use of an appropriate valve arrangement in the form of for example a tilting damper is blanked off when compressed air is injected. The disadvantage of this known cooler is that the valve arrangement is a mechanically movable component which may wear out relatively quickly when exposed to compressed air in expansion, consequently giving rise to operational problems.

SUMMARY OF THE INVENTION

It is the object of the present invention to provide a cooler for cooling hot particulate material whereby the aforementioned disadvantage is eliminated.

This is achieved by a cooler of the kind mentioned in the introduction and being characterized in that it comprises one or more flow restricting devices or flow restricting mechanisms provided in the cooling gas duct.

It is hereby obtained, without using mechanically movable components that only a very limited amount of the compressed air which is injected into the material on the grate is allowed to pass through the cooling gas duct. This is due to the fact that the one or more flow restricting devices or flow restricting mechanisms as a consequence of the pressure conditions prevailing immediately under the grate when compressed air is injected will operate as a non-return valve which will substantially prevent compressed air from passing down through the cooling gas duct.

The one or more flow restricting devices may in principle be configured and arranged in any appropriate manner. The one or more flow restricting devices may thus comprise plates, discs or other similar elements which may be fitted in the cooling gas duct, either transversely or angled in relation thereto. The one or more flow restricting devices may for example be centrally fitted in the cooling gas duct and/or fixed to the wall of the cooling gas duct, and they may consist of several elements which are offset in the longitudinal direction of the cooling gas duct.

The one or more flow restricting devices are substantially stationary but may be at least partially movable for example as a result of being manufactured completely or partially from an elastic material or in that they may possibly comprise spring-loaded parts thereby enabling the movable part(s) of the one or more flow restricting devices to follow the gas flow in the cooling gas duct, causing the flow area in the cooling gas duct to be reduced and increased, respectively, according to whether compressed air is injected or not injected.

The compressed air may in principle be injected into the material on the grate in any appropriate manner. However, it is preferred that the compressed air is injected via the grate either through a separate channel or through the cooling gas duct. If the compressed air is injected through the cooling gas duct, it is preferred that it is injected into the cooling gas duct with a velocity component which is parallel to the centerline of the cooling gas duct and pointing in the direction of the grate which means that the compressed air must be injected at an angle $\alpha$ of less than 90° relative to the centerline of the cooling gas duct. In this embodiment the compressed air is preferably injected at an angle $\alpha$ of 0° relative to the centerline of the cooling gas duct. In this embodiment of the invention it will also be possible through other pipelines or ducts for compressed air to be injected into the material which compressed air is simultaneously injected into the cooling gas duct so as to generate the static pressure between the cooling grate and the material bed which is necessary to ensure that snowmen formations and other major material agglomerations are lifted off the grate.

Other details, objects, and advantages of the invention will become apparent as the following description of certain present preferred embodiments thereof and certain present preferred methods of practicing the same proceeds.

BRIEF DESCRIPTION OF THE DRAWINGS

The invention will now be described in further details with reference to the drawings, being diagrammatical, and where FIG. 1 shows a side view of an embodiment of a cooler according to the invention, and FIGS. 2, 3 and 4 show different embodiments of the cooler according to the invention.

DETAILED DESCRIPTION OF PRESENT PREFERRED EMBODIMENTS

In FIG. 1 a cooler 1 is installed in direct extension of a rotary kiln 3 for manufacturing cement clinker. The cooler comprises an inlet end 4 and an outlet end 5. The cooler 1 also comprises a stationary grate bottom 11 for supporting the cement clinker, a fan 12 for injecting cooling gases up through the clinker via a compartment 13 and not shown in greater detail slots in the inlet grate 11, as well as a number of scraping elements 14 which by means of a not shown driving mechanism can be moved back and forth in the longitudinal direction of the cooler so that the clinker is moved from the inlet end of the cooler to its outlet end.

The cooler shown also comprises an inlet grate 21 which is located in the inlet end of the cooler 4 immediately under the outlet end of the rotary kiln for receiving the hot cement clinker 2. The design features of the inlet grate may in principle be configured in any appropriate manner. The inlet grate 21 shown as an example is stepped and made up of a number of grate shoes 22. The inlet grate is mounted at a certain inclination relative to the horizontal plane in order to promote the movement of the clinker through the cooler. In the inlet section the cooler also comprises a fan 23 for injecting cooling gas through the clinker via a compartment 24, cooling gas ducts 28 and slots 20 in the inlet grate 21, as well as a separate compressed air system comprising a compressed air tank 25 and a number of pipelines 26 for injecting compressed air into the material on the inlet grate. The pressurized tank 25 may in an alternative embodiment be constituted by a fan.

The cooler comprises flow restricting devices, or flow restricting mechanisms, 31 which are provided in the cooling gas duct 28 so that it will only be possible for a very limited amount of the compressed air being injected into the material on the grate to pass down through the cooling gas duct.

FIGS. 2 to 4 show three non-limiting examples of the configuration and position of the flow restricting devices, or flow restricting mechanisms, 31.

In the embodiment shown in FIG. 2 the flow restricting devices, or flow restricting mechanisms, are constituted by plates 31 which are alternately fixed to the opposing walls of the cooling gas duct 28 and fitted at an angle relative to the cooling gas duct 28 thereby forming between them a staggered flow path.

In the embodiment shown in FIG. 3 the flow restricting devices, or flow restricting mechanisms, are constituted by plates 31 which through the use of means not shown in greater detail are centrally fitted in the cooling gas duct 28 and displaced relative to one another in the longitudinal direction of the cooling gas duct 28.

In the embodiment shown in FIG. 4 the flow restricting devices, or flow restricting mechanisms, are constituted by a plate 31 which is formed with a centrally positioned hole and being fixed to the wall of the cooling gas duct 28. In the embodiment shown in FIG. 4, the plate 31 further comprises an inner movable part 32 manufactured from an elastic material and following the gas flow in the cooling gas duct 28 so that the flow area in the cooling gas duct 28 is reduced when compressed air is injected and increased when there is no injection of compressed air. In the embodiment shown in FIG. 4, compressed air is injected through the duct 26 directly into the cooling gas duct 28 at a location after the plate 31 and the movable part 32.

Compressed air may also be injected through other pipelines or ducts, not shown, into the material on the grate while compressed air is simultaneously injected through the duct 26 so as to generate the static pressure between the cooling grate 21 and the material bed 2 required to transiently lift the material off the grate.

As may be appreciated from the above discussed embodiments, only a very limited amount of the compressed air which is injected into the material on the grate is allowed to pass through the cooling gas duct without using mechanically movable components. This is due to the fact that the flow restricting mechanisms, or flow restricting devices, will operate as a non-return valve which will substantially prevent compressed air from passing down through the cooling gas duct as a consequence of the pressure conditions prevailing immediately under the grate when compressed air is injected.

While certain present preferred embodiments of the cooler and certain embodiments of methods of practicing the same have been shown and described, it is to be distinctly understood that the invention is not limited thereto but may be otherwise variously embodied and practiced within the scope of the following claims.

The invention claimed is:

1. A cooler for cooling hot particulate material which has been subjected to heat treatment in an industrial kiln for manufacturing cement clinker, said cooler comprising:
 a grate for receiving and supporting hot material from the kiln,
 at least one cooling gas duct which is in communication with slots in the grate for introducing cooling gases into the hot material, and
 a compressed air system for injecting compressed air into the material on the grate, the compressed air system comprising at least one flow restricting device provided in the cooling gas duct;
 wherein the compressed air is injected via the grate through a separate duct or through the cooling gas duct; and
 wherein the compressed air is injected into the cooling gas duct with a velocity component which is parallel to the centerline of the cooling gas duct and pointing in a direction of the grate.

2. A cooler according to claim 1, wherein the at least one flow restricting device comprises plates, discs or members.

3. A cooler according to claim 1, wherein the at least one flow restricting device is fitted in the cooling gas duct transversely or angled thereto.

4. A cooler according to claim 1, wherein the at least one flow restricting device is centrally fitted in the cooling gas duct and/or fixed to a wall of the cooling gas duct for positioning in the cooling gas duct.

5. A cooler according to claim 1, wherein the at least one flow restricting device is comprised of a plurality of elements which are offset in a longitudinal direction of the cooling gas duct.

6. A cooler according to claim 1, wherein the at least one flow restricting device is stationary.

7. A cooler according to claim 1, wherein the at least one flow restricting device comprises a movable part.

8. A cooler according to claim 7, wherein the moveable part is completely or partially manufactured from an elastic material or spring-loaded components.

9. A cooler according to claim 1, wherein the compressed air is injected via the grate through a separate duct or through the cooling gas duct.

10. A cooler for cooling hot material received from a kiln comprising:
 a grate for receiving and supporting the hot material from the kiln;
 at least one cooling gas duct in communication with slots in the grate for introducing cooling gases into the hot material;
 a compressed air system for injecting compressed air into the material on the grate, the compressed air system comprising at least one flow restricting device provided in the at least one cooling gas duct, the at least one flow restricting device sized and configured to substantially prevent the injected compressed air from passing through the at least one cooling gas duct as a consequence of pressure conditions under the grate when the compressed air is injected; and
 wherein the at least one cooling gas duct is comprised of a plurality of cooling ducts and wherein the compressed air system is comprised of a compressed air tank storing the compressed air and at least one pipeline for injecting the compressed air into the material on the grate, the at least one pipeline being in communication with the cooling gas ducts.

11. The cooler of claim 10 wherein the at least one flow restricting device is comprised of a plurality of flow restricting devices, each of the flow restricting devices comprised of one of a plate and a member.

12. The cooler of claim 10 wherein the at least one flow restricting device is comprised of an elastic material such that the at least one flow restricting device is moveable when the compressed air is injected to reduce a flow area in the cooling gas duct.

13. The cooler of claim 10 wherein the at least one flow restricting device is comprised of a spring such that the at least one flow restricting device is moveable when the compressed air is injected to reduce a flow area in the cooling gas duct.

14. The cooler of claim 10 wherein the material is lifted off of the grate via static pressure between the grate and a bed of the material by the compressed air being fed to the at least one cooling gas duct.

15. The cooler of claim 10 wherein the at least one flow restricting device is comprised of a plurality of flow restricting devices, each flow restricting device being provided in a respective one of the cooling gas ducts, each of the flow restricting devices being configured such that a flow area within the cooling gas duct of that flow restricting device is reduced when compressed air is injected into the material a flow area within the cooling gas duct of that flow restricting device, the compressed air being injected into the material via a portion of the at least one cooling gas duct after the flow area within the at least one cooling gas duct is reduced, and wherein when no compressed air is injected into the material the flow area within the at least one cooling gas duct is increased.

* * * * *